(12) United States Patent
Kroeker et al.

(10) Patent No.: US 8,103,057 B2
(45) Date of Patent: *Jan. 24, 2012

(54) SYSTEM AND METHOD FOR CAPTURING IMAGES OF A TARGET AREA ON WHICH INFORMATION IS RECORDED

(75) Inventors: Wallace Kroeker, Calgary (CA); Olugbenga Ayinde, Calgary (CA)

(73) Assignee: SMART Technologies ULC, Calgary, Albera (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/709,802

(22) Filed: Feb. 22, 2010

(65) Prior Publication Data
US 2010/0149349 A1 Jun. 17, 2010

Related U.S. Application Data

(63) Continuation of application No. 10/377,111, filed on Mar. 3, 2003, now Pat. No. 7,684,624.

(51) Int. Cl.
*G06K 9/00* (2006.01)
*G06K 9/62* (2006.01)
*G06G 5/00* (2006.01)
(52) U.S. Cl. .......................... 382/103; 382/209; 345/156
(58) Field of Classification Search .................. 382/209, 382/103; 345/156
See application file for complete search history.

(56) References Cited

U.S. PATENT DOCUMENTS

| | | | |
|---|---|---|---|
| 4,061,914 A * | 12/1977 | Green | 250/234 |
| 5,020,114 A | 5/1991 | Fujioka et al. | |
| 5,140,647 A | 8/1992 | Ise et al. | |
| 5,280,530 A * | 1/1994 | Trew et al. | 382/103 |
| 5,490,655 A | 2/1996 | Bates | |
| 5,528,290 A | 6/1996 | Saund | |
| 5,537,107 A | 7/1996 | Funado | |
| 5,581,637 A | 12/1996 | Cass et al. | |
| 5,594,502 A | 1/1997 | Bito et al. | |

(Continued)

FOREIGN PATENT DOCUMENTS

JP 07186955 A * 7/1995

(Continued)

OTHER PUBLICATIONS

Polyvision, CopyCam, 2001 Polyvision Corporation, www.websterboards.com, 3 pages.

(Continued)

*Primary Examiner* — Wengpeng Chen
(74) *Attorney, Agent, or Firm* — Katten Muchin Rosenman LLP

(57) ABSTRACT

A system for capturing images of a target area on which information is recorded includes a boom assembly adapted to extend outwardly from a generally vertical surface. At least one digital camera is mounted on the boom assembly at a location spaced from the surface. The at least one digital camera is oriented so that the field of view thereof encompasses a target area on the surface. A controller is in communication with the at least one digital camera. The controller conditions the at least one digital camera to acquire an image of the target area. The image acquired by the at least one digital camera is conveyed to the controller and is processed to determine if an obstacle blocking the target area is in the captured image. If so, the captured image is not further processed and additional images are acquired until an image of the target area is captured without the obstacle therein.

54 Claims, 7 Drawing Sheets

U.S. PATENT DOCUMENTS

| | | | |
|---|---|---|---|
| 5,625,705 A * | 4/1997 | Recht | 382/128 |
| 5,708,355 A | 1/1998 | Schrey | |
| 5,957,700 A * | 9/1999 | Ariyama | 434/417 |
| 6,075,905 A | 6/2000 | Herman et al. | |
| 6,163,755 A | 12/2000 | Peer et al. | |
| 6,179,426 B1 | 1/2001 | Rodriguez et al. | |
| 6,243,482 B1 | 6/2001 | Eibert et al. | |
| 6,411,867 B1 | 6/2002 | Sakiyama et al. | |
| 6,496,122 B2 | 12/2002 | Sampsell | |
| 6,497,608 B2 | 12/2002 | Ho et al. | |
| 6,517,266 B2 | 2/2003 | Saund | |
| 6,522,830 B2 | 2/2003 | Yamagami | |
| 6,530,664 B2 | 3/2003 | Vanderwerf et al. | |
| 6,661,918 B1 * | 12/2003 | Gordon et al. | 382/173 |
| 6,802,611 B2 | 10/2004 | Chu et al. | |
| 7,084,859 B1 * | 8/2006 | Pryor | 345/173 |
| 7,224,847 B2 | 5/2007 | Zhang et al. | |
| 7,260,257 B2 | 8/2007 | Zhang et al. | |
| 7,684,624 B2 * | 3/2010 | Kroeker et al. | 382/209 |
| 2003/0165276 A1 * | 9/2003 | Seeger et al. | 382/278 |
| 2003/0234772 A1 * | 12/2003 | Zhang et al. | 345/177 |
| 2004/0075820 A1 * | 4/2004 | Chu et al. | 353/122 |
| 2004/0165768 A1 * | 8/2004 | Zhang et al. | 382/162 |

FOREIGN PATENT DOCUMENTS

| | | | |
|---|---|---|---|
| JP | 08201530 A | * | 8/1996 |
| JP | 2000009429 | | 1/2000 |
| JP | 2000009429 A | * | 1/2000 |

OTHER PUBLICATIONS

Moran, et al., "Design and Technology for Collaborage: Collaborative Collages of Information on Physical Walls", Proceedings of the 12$^{th}$ annual ACM Symposium on User Interface Software and Technology. Nov. 1999.

* cited by examiner

SYSTEM AND METHOD FOR CAPTURING IMAGES OF A TARGET AREA ON WHICH INFORMATION IS RECORDED

This application is a continuation of U.S. patent application Ser. No. 10/377,111, filed Mar. 3, 2003, incorporated herein by reference.

FIELD OF THE INVENTION

The present invention relates generally to image acquisition and in particular to a system and method for capturing images of a target area on which information is recorded.

BACKGROUND OF THE INVENTION

During meetings, boards such as whiteboards, chalkboards, flipchart pads, and tackboards are commonly used to record information. In collaborative environments, several users may view, supplement and/or edit information recorded on the boards. In situations where the boards are passive, it is difficult and cumbersome to transfer information recorded on the boards to other media that facilitate storage and retrieval of the recorded information.

To deal with the above problem, automated capture systems to capture information recorded on a board have been considered. These automated capture systems include for example, automated copyboards, flipchart scanners, active or specialized pen systems based on acoustic time-of-flight, electromagnetic detection, or laser scanning as well as analog resistive whiteboards. Although these automated capture systems have permitted information recorded on a board to be transferred to other media types, these automated capture systems suffer disadvantages.

In addition to the automated capture systems described above, camera-based systems to capture information recorded on a board have been considered. For example, U.S. Pat. No. 5,528,290 to Saund discloses a device for transcribing markings drawn on a whiteboard or blackboard into an electronic form using a camera-based board scanner. The scanner is in the form of a video camera mounted on a computer controlled pan/tilt head suspended from the ceiling or mounted to one side of the board. The camera is directed successively at small regions (tiles) of the board and snapshots of the tiles are captured until a complete image of the entire board is obtained. The camera image tiles slightly overlap with neighbouring camera image tiles so that a complete image of the board is obtained with no missing spaces.

U.S. Pat. No. 5,581,637 to Cass et al discloses a device for transcribing markings drawn on a background surface such as a whiteboard or blackboard into an electronic form using a video camera. A registration light pattern is projected onto the background surface to be imaged. The projected pattern is selected to suit the properties of the video camera and the imaging environment. The video camera is directed successively at tiles of the background surface and snapshots of the tiles are captured until a complete image of the entire background surface is obtained. The pattern markings are processed using perspective transformations to determine the overlap properties of the camera image tiles and the distortion of each camera image tile. The resulting data is used to combine the camera image tiles to produce an undistorted image of the entire background surface.

U.S. Patent Application Publication No. US2004/0201698 to Keenan et al. discloses a camera-based system for capturing images of a background surface such as a whiteboard. The camera-based system includes a generally horizontal boom assembly mounted above the whiteboard that supports a plurality of cameras. The cameras look back at the whiteboard and are actuable to capture images of sections of the whiteboard. The camera images are stitched to form an entire image of the whiteboard.

In the above-described camera-based systems, it is typically desired that all information recorded on the background surface be captured in images acquired by the cameras. Unfortunately, in some instances images of the background surface are captured and processed when an obstacle such as a person, a piece of furniture or other object obscures a portion of the background surface from the fields of view of the cameras. The end result is incomplete images and wasted processing and memory resources. As will be appreciated, improvements in systems of this nature to obviate or mitigate the above disadvantage are desired.

It is therefore an object of the present invention to provide a novel system and method for capturing images of a target area on which information is recorded.

SUMMARY OF THE INVENTION

According to one aspect of the present invention there is provided a system for capturing an image of a target area on which information is recorded comprising:

at least one imaging device capturing an image of said target area; and a processor in communication with said at least one imaging device, said processor receiving image data from said at least one imaging device and processing said image data to detect the presence of obstacles in the captured image.

According to another aspect of the present invention there is provided a camera-based system for capturing an image of a target area comprising:

a generally horizontally extending boom assembly, said boom assembly being positioned above a target area on which information is recorded;

at least one digital camera mounted on said boom assembly at a location spaced from the plane of said target area, said at least one digital camera being oriented so that the field of view thereof encompasses said target area; and a processor in communication with said at least one digital camera, said processor receiving image data from said at least one digital camera and processing said image data to detect the presence of an obstacle in the captured image, said processor conditioning said at least one digital camera to acquire another image of said target area in the presence of an obstacle in said captured image.

According to yet another aspect of the present invention there is provided a method of detecting the presence of an obstacle in front of a background surface on which information is to be recorded, in a captured image of said background surface, said method comprising the steps of:

comparing the captured image with a reference image and computing a difference image; and examines the difference image to determine of the difference image has pixels suggestive of an obstacle.

According to still yet another aspect of the present invention there is provided a method of capturing and storing images of a background surface on which information is recorded, said method comprising the steps of capturing a low resolution image of the background surface;

processing the low resolution image to determine if an obstacle obscuring the background surface is in said low resolution image; and if no obstacle is in said low resolution image, capturing a high resolution image of said background surface.

According to still yet another aspect of the present invention there is provided a method of capturing and storing images of a background surface on which information is recorded, said method comprising the steps of:

capturing an image of the background surface;

processing the image to determine if an obstacle obscuring the background surface is in the captured image; and processing the captured image to highlight information recorded on the background surface when no obstacle is in said captured image.

The present invention provides advantages in that since captured images are analyzed to detect the presence of an obstacle therein, when an obstacle is detected in a captured image, the captured image is not processed further thereby saving computing resources and memory. Also, by taking successive images and determining when an obstacle moves out of the field of view, the change in obstacle detection can be used as a cue to process the captured image devoid of the obstacle.

BRIEF DESCRIPTION OF THE DRAWINGS

Embodiments of the present invention will now be described more fully with reference to the accompanying drawings in which:

FIG. 4b is an isometric view of the controller of FIG. 4a;

DETAILED DESCRIPTION OF THE PREFERRED EMBODIMENTS

The present invention relates generally to a system and method for capturing an image of a target area on which information is recorded. At least one imaging device is actuable to capture an image of the target area. A processor communicates with the at least one imaging device and processes image data received from the at least one imaging device to detect the presence of an obstacle in the captured image. In this manner a decision can be made as to whether the captured image is to be further processed. Preferred embodiments of the present invention will now be described with reference to FIGS. 1 to 8.

Figure 1:
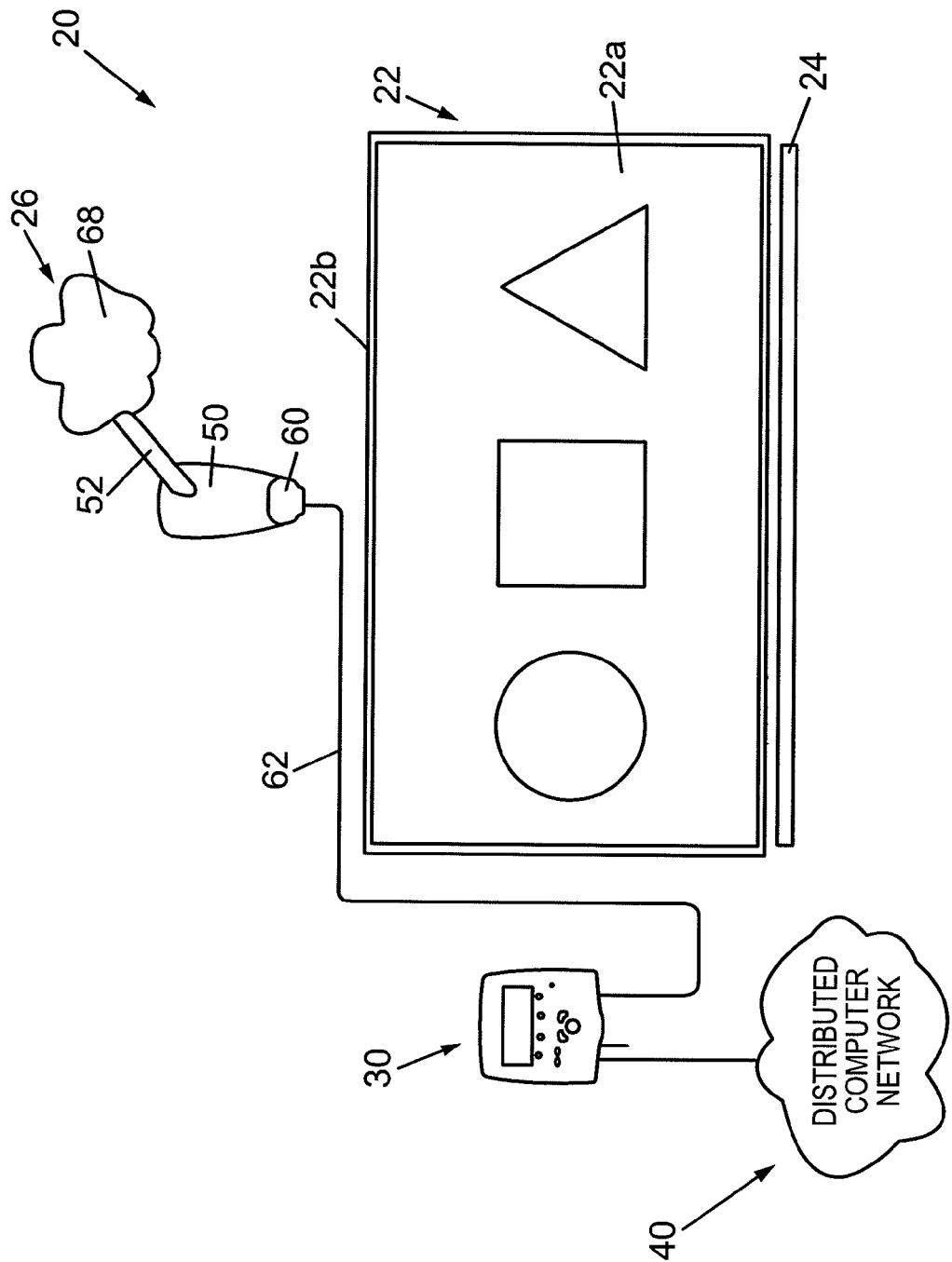
FIG. 1 is an isometric view of a camera-based system for capturing images of a target area on which information is recorded in accordance with the present invention.

Turning now to FIG. 1, a camera-based system for capturing images of a background surface and automatically posting the images to an Internet accessible site in accordance with the present invention is shown and is generally identified by reference numeral 20. System 20 is similar to that disclosed in U.S. Patent Application Publication No. US2004/0201698 to Keenan et al., assigned to SMART Technologies Inc., assignee of the present invention, the content of which is incorporated herein by reference. As can be seen, the system 20 includes a whiteboard 22, defining the background surface to be imaged, that is mounted on a wall surface. In this embodiment, the whiteboard 22 includes a generally planar rectangular board surface 22a bordered by a frame 22b. An elongate tool tray 24 is disposed slightly below the whiteboard 22 and supports tools in the form of dry-erase ink pens and an eraser. Using the pens and eraser, information can be recorded on the whiteboard 22, as well as edited and erased. In FIG. 1, a circle, a square and a triangle have been drawn on the surface 22a of the whiteboard 22.

A boom assembly 26 is also mounted on the wall surface slightly above the midpoint of the whiteboard 22. The boom assembly 26 extends outwardly from the wall surface in a generally horizontal disposition a distance equal to about 30 to 50 inches. A controller 30 is also mounted on the wall surface to one side of the whiteboard 22 and communicates with the boom assembly 26 and with a distributed computer network 40.

Figure 2:
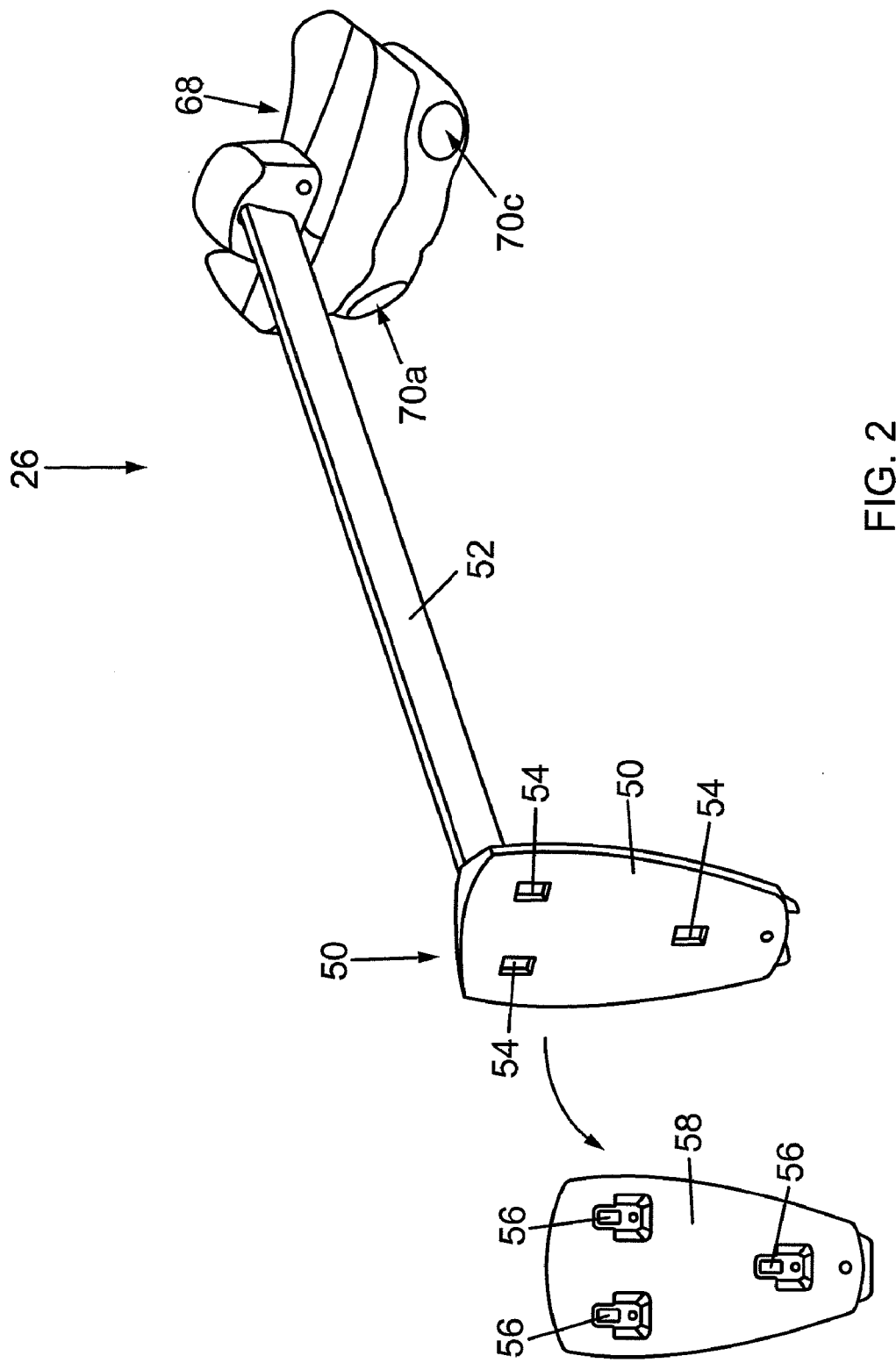
FIG. 2 is an exploded isometric view of a boom assembly forming part of the camera-based system of FIG. 1.

FIG. 2 better illustrates the boom assembly 26 and as can be seen, boom assembly 26 includes a wall mount 50 receiving one end of an elongated boom 52. Wall mount 50 has a plurality of slots 54 formed in its rear surface. The slots 54 releasably receive complimentary tabs 56 on a mounting plate 58 that is secured to the wall surface by suitable fasteners (not shown). The wall mount 50 also includes a pivoting cap 60 that can be moved to expose a pair of plug-in high speed serial data communication ports (not shown). One of the data communication ports receives a cable 62 that extends to the controller 30. The other data communication port is designed to receive a cable leading to the wall mount of an adjacent boom assembly when a number of whiteboards and boom assemblies are arranged in a side-by-side chain.

A camera head 68 is disposed on the opposite end of the boom 52 and supports a pair of imaging devices in the form of digital cameras 70a and 70b. The digital cameras 70a and 70c are aimed back towards the whiteboard 22. Each digital camera is fitted with an appropriate field-of-view lens so that it captures a different section (tile) of the whiteboard 22. The field-of-view lenses are however selected so that there is a small overlap in the images captured by the digital cameras 70a and 70c.

Figure 3:
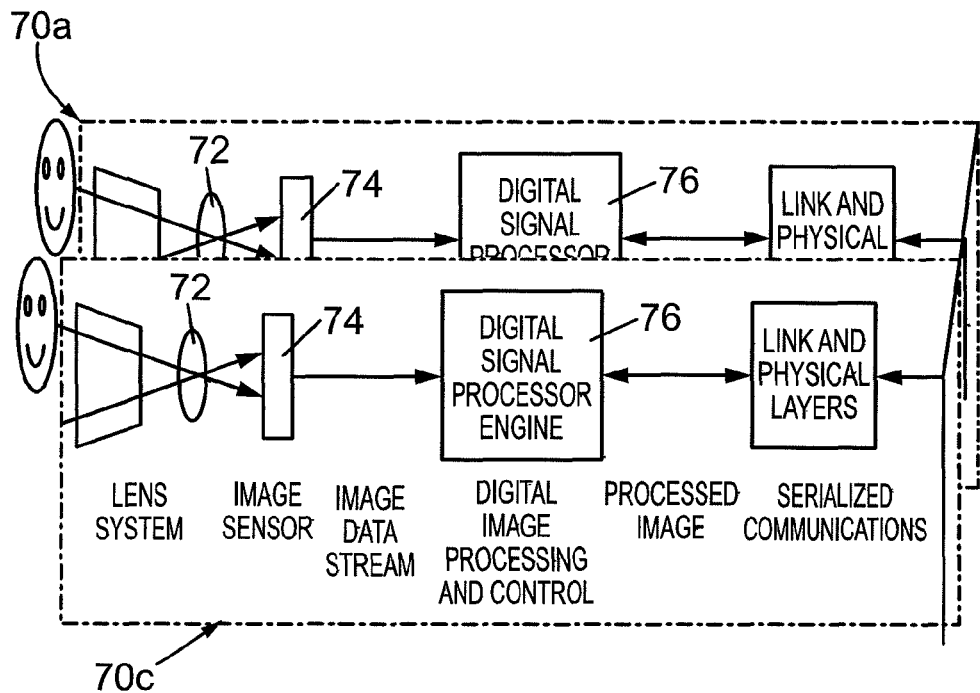
FIG. 3 is a block diagram of a digital camera forming part of the boom assembly of FIG. 2.

Turning now to FIG. 3 the digital cameras 70a and 70c within the camera head 68 are shown. As can be seen, each digital camera includes a lens system 72 and an image sensor 74. A digital signal processor (DSP) engine 76 is connected to the image sensor 74 and to the high-speed serial data communication ports by cables (not shown) running through the boom 52.

Figure 4B:
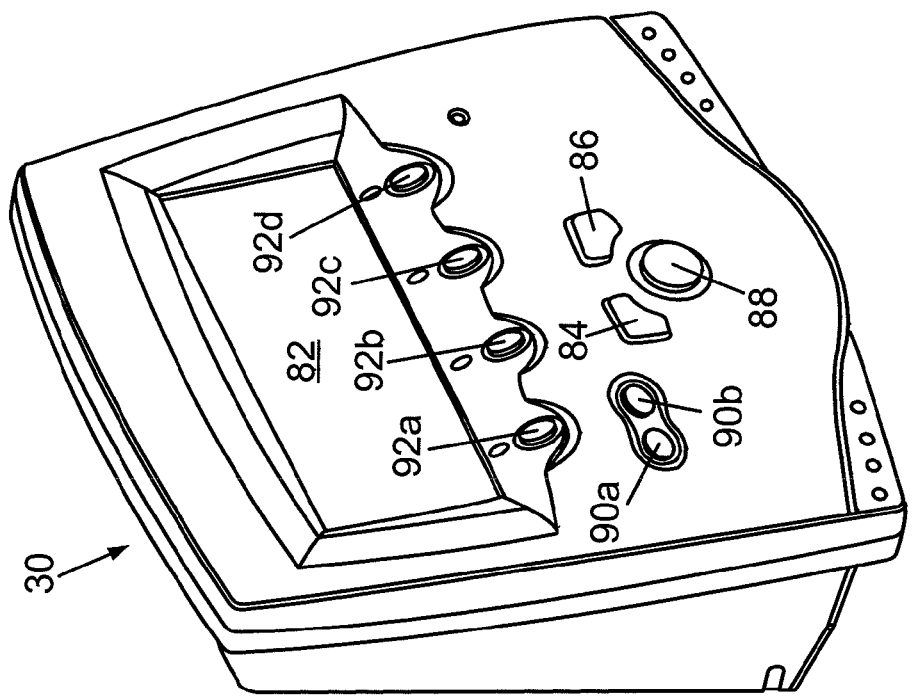
Figure 4A:
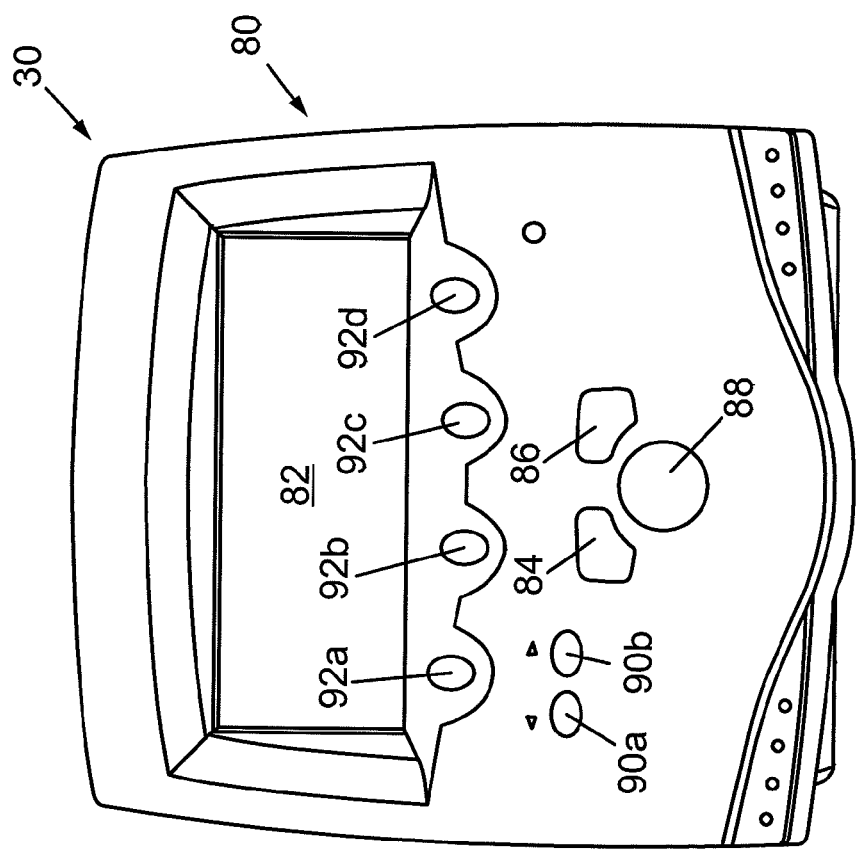
FIG. 4a is a front elevational view of a controller forming part of the camera-based system of FIG. 1.

FIGS. 4a to 4b better illustrate the controller 30. As can be seen, controller 30 includes a housing 80 having a liquid crystal display screen 82 and a series of user selectable controls in the form of depressable buttons. In this particular embodiment, the buttons include a session open button 84, a session close button 86 and a capture image button 88. A pair of scroll buttons 90a and 90b allow a user to scroll through features presented on the display screen 82. Buttons 92a to 92d allow features presented on the display screen 82 to be selected.

Figure 5:
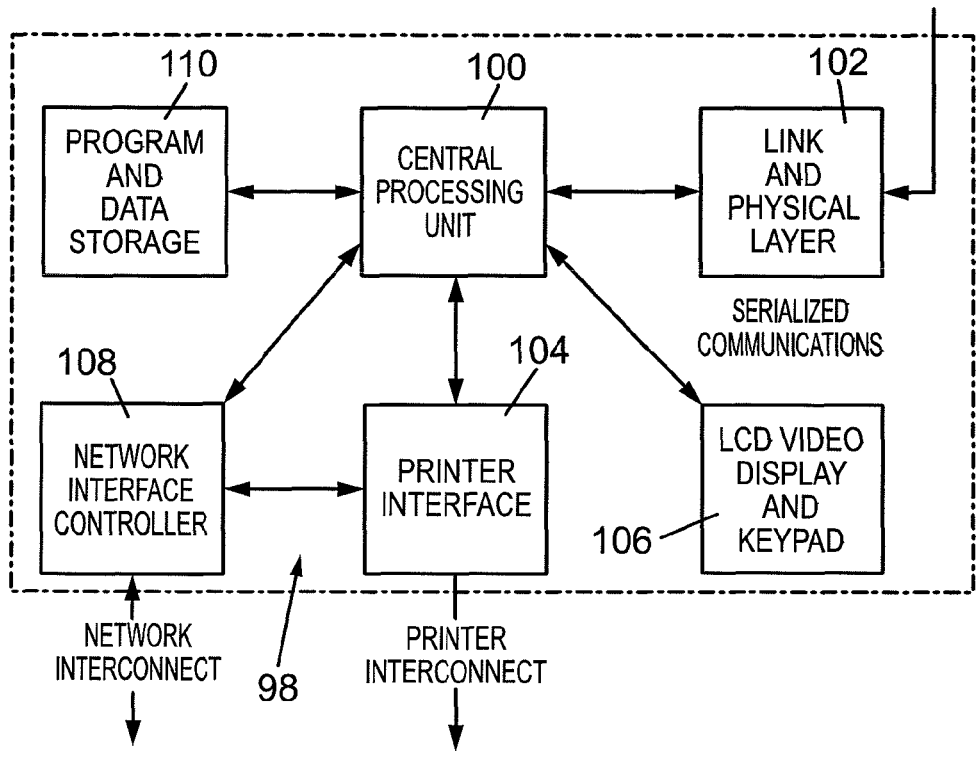
FIG. 5 is a block diagram of the controller internal circuitry.

FIG. 5 illustrates the internal circuitry 98 within the housing 80. As can be seen, the internal circuitry 98 includes a central processing unit (CPU) 100 communicating with a high speed serial data communication port 102, a printer interface 104, an LCD video display and a keypad driver 106, a network interface controller 108 and memory 110. High-speed data communication port 102 receives the cable 62 leading to the boom assembly 26. LCD video display and keypad driver 106 drives the display screen 82 and the buttons 84 to 92d. Printer driver 104 is coupled to a port accessible through the housing 80 that is designed to receive a cable extending to an external printer. Printer driver 104 is also coupled to the network interface controller 108.

The central processing unit 100 includes Internet server capabilities and executes software loaded in the memory 110 so that image data output by the digital cameras 70a and 70c can be processed, converted into digital images in .JPEG format and made accessible to users through the distributed computer network 40. In this manner, users can access the digital images through web client applications such as web browsers. Further specifics concerning the operation of the system 20 will now be described with particular reference to FIGS. 6 and 7.

Using the system 20 is very simple regardless of the technical skill level of the user. The controller 30 does not need to be operational prior to drawing or writing on the surface 22a of the whiteboard 22. Once information is recorded on the surface 22a of the whiteboard 22, images of the recorded information can be acquired provided a session is open. If a session is not open, the user must press the session open button 84 to open a session. When the session open button is pressed, the CPU 100 creates a session so that all images captured within the open session are stored collectively.

Figure 6:
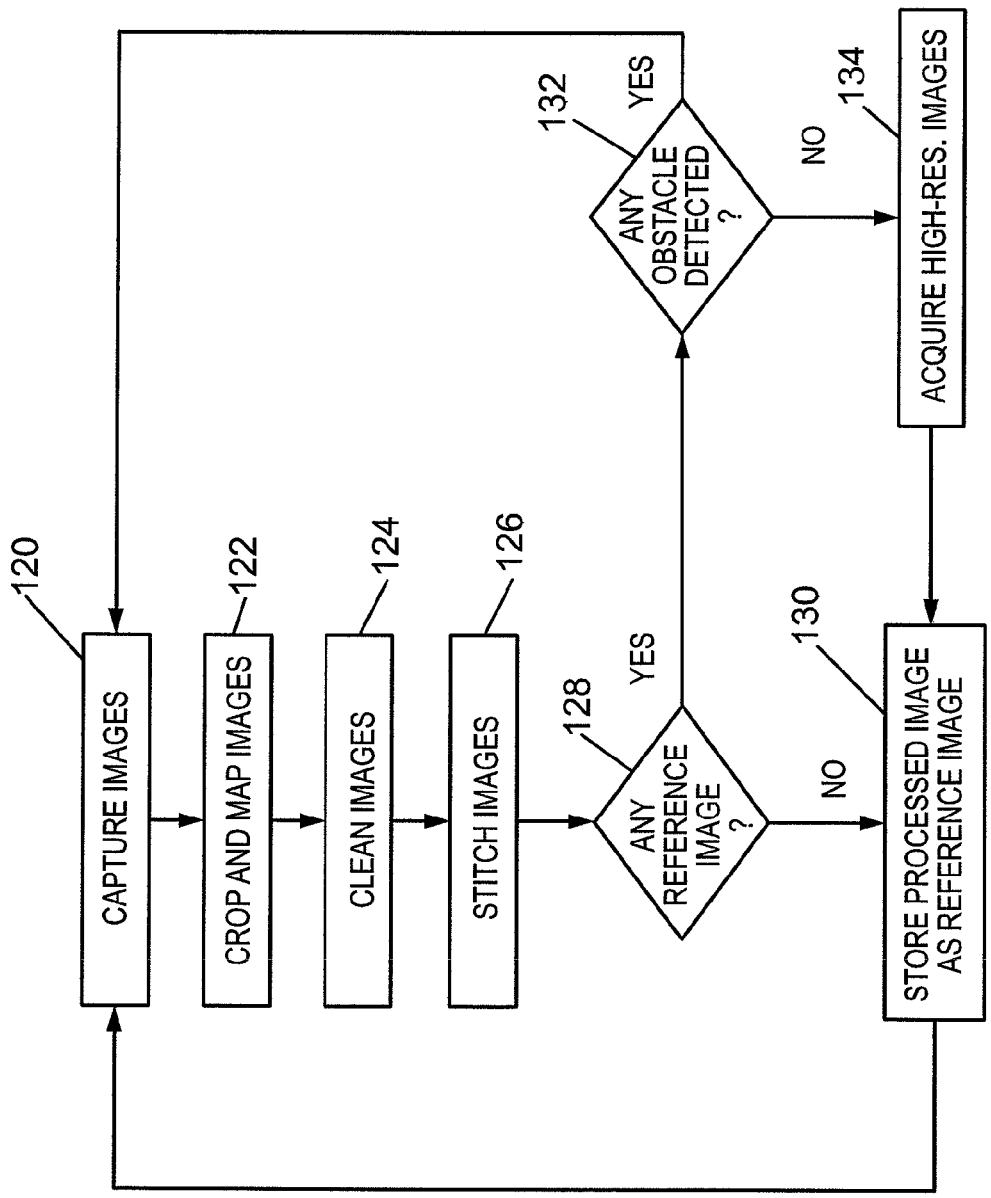
FIG. 6 is a flowchart illustrating the steps performed by the camera-based system of FIG. 1 during image capture and processing.
Figure 7:
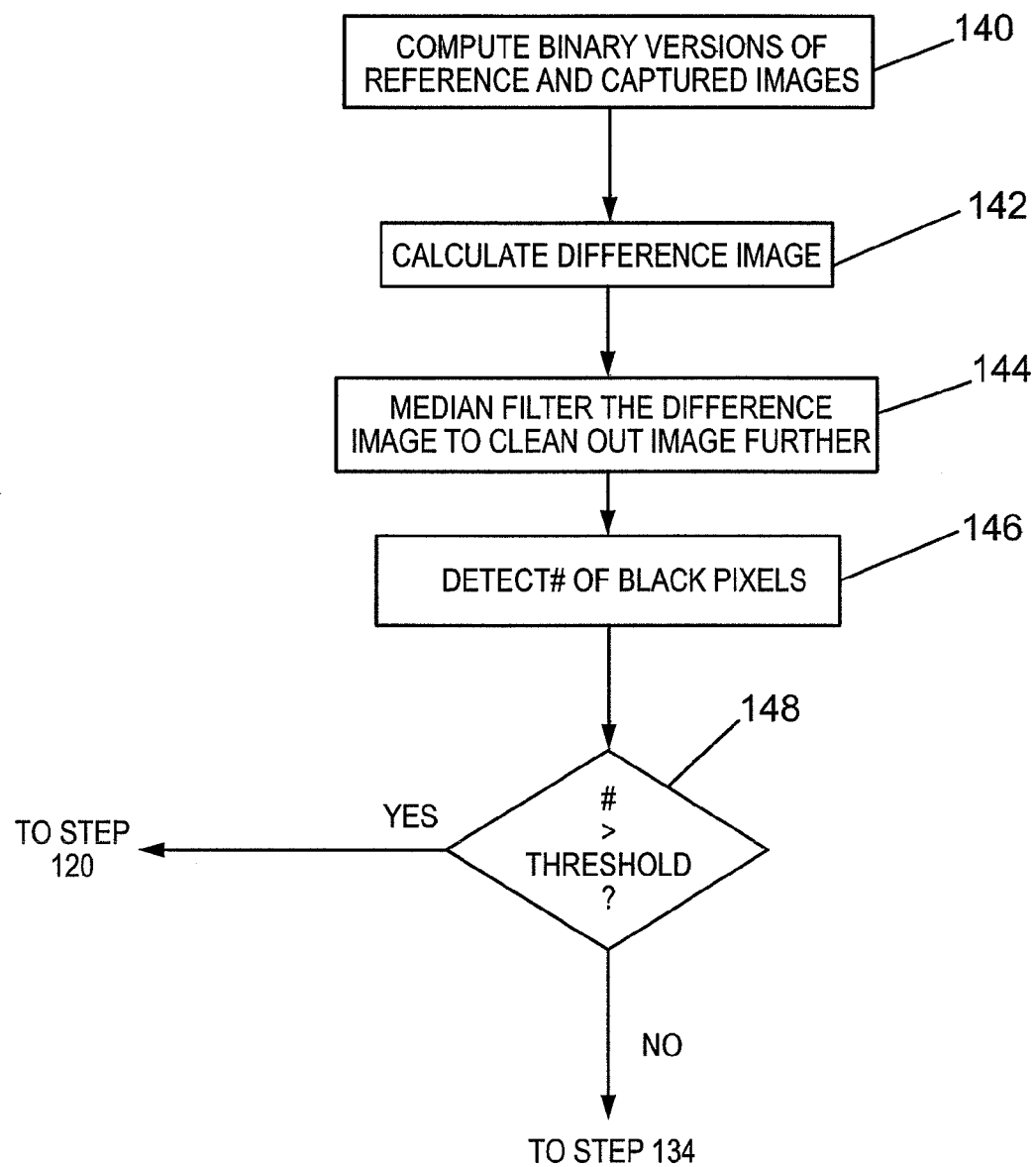
FIG. 7 is a flow chart illustrating the steps performed by the camera-based system during obstacle detection.

Once a session has been opened, when the capture image button 88 is pressed the digital cameras 70a and 70c are conditioned by the DSP engine 100 to capture low resolution images of the whiteboard 22 and surrounding area (see step 120 in FIG. 6). In the present embodiment, the resolution of these images is 302×217. After each digital camera 70 and 70c has captured a low resolution image of the whiteboard 22, the raw image data from the image sensors 74 is acquired by the DSP engine 76 and conveyed to the CPU 100 over a high speed data communications link via the cable 62. When the CPU 100 receives the image data, the images are cropped and mapped into a rectangle to limit the images to the whiteboard area (step 122). In order to enable the images to be cropped and mapped, during initialization of the system, 20, targets are placed at the corners of the surface 22a and images are captured. The locations of the targets are then detected in the captured images and are used to extract points that delineate the whiteboard area and allow the whiteboard area to be mapped into the rectangle. The extracted points are stored in memory and are used each time whiteboard images are captured so that the captured images can be cropped and mapped into the rectangle (i.e. limited to the appropriate area of interest).

Once the images have been cropped and mapped into the rectangle, the images are cleaned to remove noise and unwanted speckles from the image (step 124). During image cleaning, background shades of white created in various lighting conditions are removed so that only high contrast pen strokes on a white or empty background remain. The image cleaning process is disclosed in U.S. Patent Application Publication No. US2003/156118 to Ayinde, assigned to SMART Technologies Inc., assignee of the present invention, the content of which is incorporated herein by reference. Accordingly, specifics of the image cleaning process will not be described herein.

Once the images have been cleaned at step 124, the images are stitched by the CPU 100 (step 126). In order to stitch adjacent images together, the surface 22a of the whiteboard includes target references or cross-hairs (not shown) thereon that are positioned so each image includes a common pair of target references. The common target references allow the images to be easily stitched together by the CPU 100. Other image stitching methods can of course be used such as that disclosed in U.S. Pat. No. 5,528,290 to Saund.

After stitching at step 126, a check is made to determine if a reference image exists (step 128). If not, the image is stored as a reference image (step 130) and the process returns to step 120. If a reference image exists, the whiteboard image is analyzed to determine if an obstacle is present in the image (step 132). In order to determine if an obstacle is present in the whiteboard image, binary versions of the reference and whiteboard images are computed (see step 140 in FIG. 7). A difference image is then calculated using the binary versions of the whiteboard image and the reference image (step 142). During generation of the difference image, the negative of the difference between the two images is computed by comparing the whiteboard and reference images pixel by pixel. For every corresponding pixel in both images the following value is computed:

$$(255-|R_{ij}-C_{ij}|)$$

where:

$R_{ij}$ is the binary form of the pixel at the $i^{th}$ row and $j^{th}$ column in the reference image (255 for white, 0 for black); and $C_{ij}$ is the binary form of the pixel at the $i^{th}$ row and $j^{th}$ column in the whiteboard image.

This yields a black on white image where pixels having different values in the two images are set to black and pixels having the same values in the two images are set to white. The difference image is then cleaned again using median filtering performed in N iterations to remove noise and unwanted speckles from the computed negative difference image (step 144). It has been found that N=3 yields good results in a variety of conditions although N can be varied.

The number of pixels in the cleaned difference image that are black is then determined (step 146) and compared to a threshold value (step 148). If the number of pixels in the difference image having a black value is greater than the threshold value, an obstacle is deemed to be present in the whiteboard image. Typically a change in the number of black pixels between a whiteboard image and the reference image greater than about 2% signifies the presence of an obstacle.

If an obstacle is determined to be in the whiteboard image at step 132, the whiteboard image is not processed any further. The process then reverts to step 120 where the CPU 100 conditions the digital cameras 70a and 70c to capture low resolution images again. This process continues until the digital cameras 70a and 70c capture low resolution images devoid of an obstacle. During this routine, if an obstacle is present in the captured low resolution images for a threshold number of consecutive frames or a threshold period of time, the CPU 100 stores the whiteboard image as the new reference image (step 130) and conditions the digital cameras 70a and 70c to acquire high-resolution images of the whiteboard 22 (step 134). As will be appreciated, since captured images having obstacles detected therein are generally not stored or processed any further after the obstacles have been detected, memory and processing resources are conserved.

At step 132, when no obstacle is present in the whiteboard image, the CPU 100 stores the whiteboard image as the new reference image (step 130) and conditions the digital cameras 70a and 70c to acquire high-resolution images of the whiteboard 22 (step 134). In the present embodiment, the resolution of these images is 2100×1564. After the digital cameras 70a and 70c have acquired high-resolution images of the whiteboard 22, raw image data from the image sensors 74 is acquired by the DSP engines 76 and conveyed to the CPU over a high speed data communications link via the cable 62. When the CPU 100 received the raw image data, the CPU converts the raw image data into color images and crops and maps the high-resolution image into a rectangle to limit the image to the whiteboard area. The CPU 100 then stitches the images together to form a complete image of the whiteboard 22 and the high-resolution image is cleaned in the manner discussed above. With the high-resolution image cleaned, the CPU 100 conditions the LCD video display and keyboard driver 106 to present the whiteboard image on the display screen 82 to provide quick visual feedback to the user. A copy of the whiteboard image may also be sent to a designated secondary storage location such as a personal computer forming part of the distributed computer network 40. The image can also be posted to an Internet accessible site as disclosed in U.S. Patent Application Publication No. US2004/0201698.

Once the high-resolution whiteboard image is available, if desired, a user can select a print command using the option buttons on the housing 80. When the CPU 100 receives a print command, the CPU 100 outputs the high-resolution whiteboard image to the printer driver 104 which in turn outputs the whiteboard image either to a printer coupled to the printer driver port or to the network interface controller 108 so that the electronic image can be printed by a network printer in the distributed computer network 40.

When the user is finished a session, the user simply needs to push the close session button 86. If the user wishes to continue using the system 20, a new session must be opened by pushing the open session button 84. Images captured during the new session are saved and posted separately.

Although the system 20 is described as including a controller that receives the image data from the digital cameras 70a and 70c, the image data can be routed directly to a personal computer for processing and storage.

In addition, rather than requiring the capture image button 88 to be depressed in order to capture images of the whiteboard 22, the CPU 100 can be programmed to condition the digital cameras 70a and 70c to acquire low resolution images of the whiteboard 22 at specified intervals. Each set of captured low resolution images is cropped, cleaned, stitched and analyzed for obstacle presence in the manner described above. Once a whiteboard image has been captured devoid of an obstacle, the digital cameras 70a and 70c are conditioned by the CPU 100 to capture high-resolution images.

Furthermore, if desired, each low resolution image can be compared with the previous captured low resolution whiteboard image to determine if any changes in the information recorded on the whiteboard 22 have occurred. If no changes in recorded information have occurred, the captured low resolution whiteboard image are not processed. In this manner, even though the digital cameras 70a and 70c are conditioned to acquire images at selected intervals, the captured images are only processed to detect the presence of an obstacle if they include new information.

Alternatively, the CPU 100 can be programmed to monitor the low resolution images captured by the digital cameras 70a and 70c continuously to determine when an obstacle moves into and out of the fields of view of the digital cameras 70a and 70c. As soon as an obstacle has moved out of the fields of view of the digital cameras, the CPU 100 conditions the digital cameras 70a and 70c to capture high-resolution images immediately. In this manner, a change in obstacle presence is used as a cue to capture high-resolution images of the whiteboard 22.

If desired, greyscale processing can be applied to the difference image to turn the difference image into a black on a white image. During greyscale processing, a threshold is applied to the negative difference image to convert the negative difference image into a binary (black and white) image. The threshold value can have a value ranging from 0 to 255. The threshold value that is selected depends on the degree of obstacle detect sensitivity that is desired. A threshold value equal to 128 has been found to yield good results in a variety of conditions.

After thresholding, the region of the binary image close to the frame surrounding the whiteboard is excluded and the remaining portion of the binary image is examined to detect clusters of black pixels. In this instance, if the thresholded difference image includes clusters of black pixels above a threshold value, an obstacle is considered to be present in the captured low resolution whiteboard image.

Depending on the quality of the low-resolution images captured by the digital cameras 70a and 70c, obstacle detection may be limited to the of frame portion of the whiteboard area. Typically, obstacles moving into and out of captured images will extend through the whiteboard frame 22b.

Figure 8:
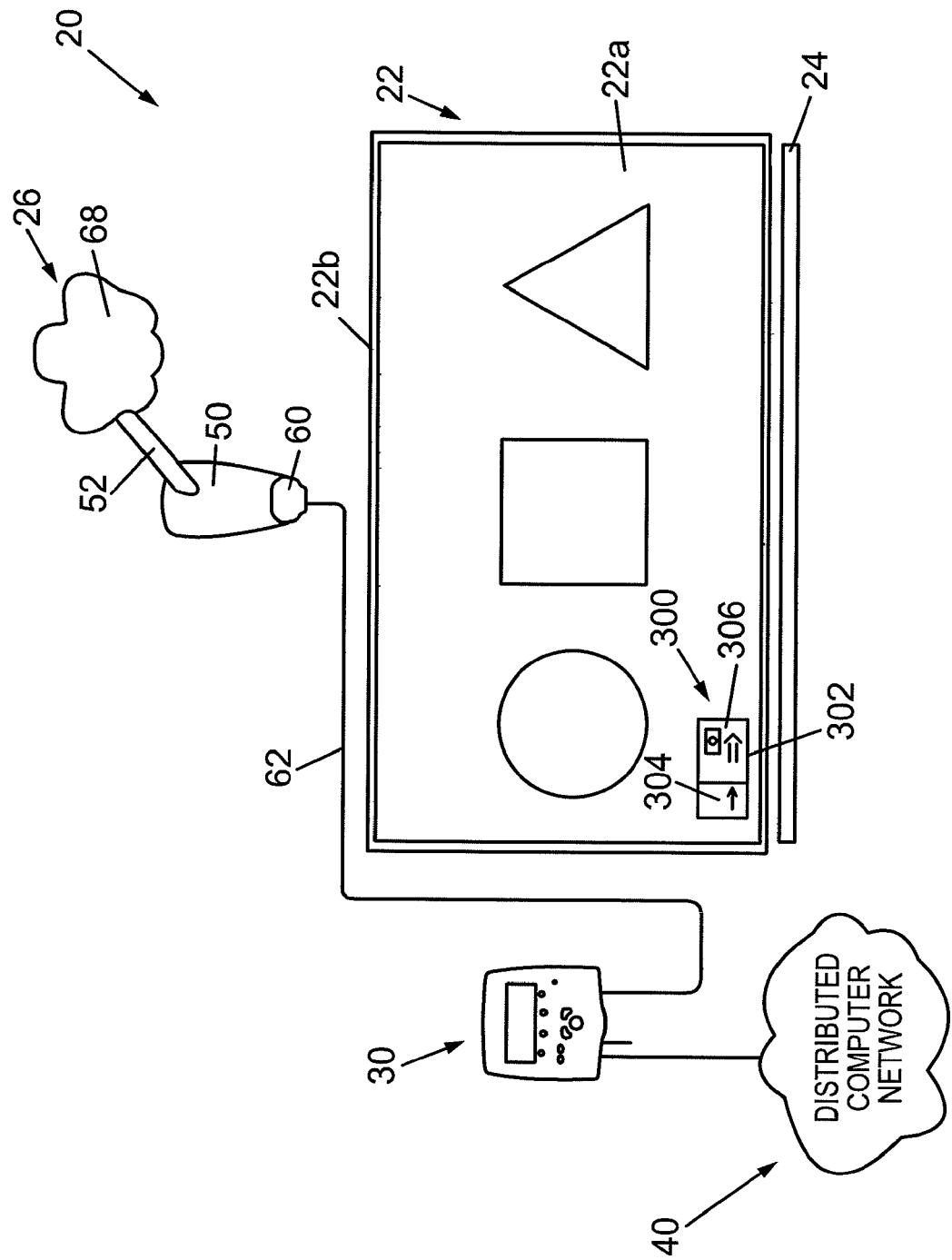
FIG. 8 is an isometric view of a camera-based system for capturing images of a target area including a whiteboard with an optical switch.

Turning now to FIG. 8, an alternative whiteboard for use with the camera-based system is shown. In this embodiment, like reference numerals will be used to indicate like components with a "200" added for clarity. Similar to the previous embodiment, the whiteboard 222 includes a generally planar rectangular board surface 222a bordered by a frame 222b. An elongate tool tray 224 is disposed slightly below the board surface 222a and supports tools in the form of dry-erase ink pens and an eraser.

An optical switch 300 is positioned on the board surface 222a adjacent its lower left-hand corner. The optical switch 300 includes a rectangular frame 302 and a slider 304 moveable horizontally along the frame 302 between left and right positions. Pictograms 306 are provided on the board surface 222a in the area encompassed by the frame 302 to direct a user to move the slider 304 from one side of the frame 302 to the other in order to condition the system 20 to capture images of the whiteboard 222. Those of skill in the art will appreciate that the optical switch may be located at basically any location within the fields of view of the cameras 70a and 70c.

In this embodiment, the CPU 100 conditions the digital camera 70c acquire a low resolution image of the whiteboard at specified intervals. When the digital camera 70c acquires a low resolution image, the acquired low resolution image is compared with a previously captured low resolution image to determine if the position of the slider 304 has changed. If the position of the slider is the same, the process continues. If the position of the slider has changed, the CPU 100 conditions both digital cameras 70a and 70c to acquire low resolution images of the whiteboard 222. The acquired low resolution images are then cropped, cleaned, stitched and analyzed for obstacle presence in the manner described above.

As will be appreciated, in this embodiment the optical switch 300 when recognized as changing positions provides a trigger or cue to capture images of the board surface 222a. Alternative optical switch configurations can of course be used provided a change in condition of the optical switch can be determined from the captured images. For example, the optical switch 300 may include a mechanical button that when depressed moves the slider 304 from one side of the frame 302 to the other. The slider 304 can of course be replaced with another type of element that moves between positions to trigger or cue image capture. Further, actuation of the optical switch 300 may be used as a cue to inhibit image capture.

In the above-described embodiments, the digital cameras 70a and 70c are described as capturing low resolution images that are processed to detect the presence of an obstacle prior to capturing high-resolution images. If desired, high-resolution images can be captured by the digital cameras 70a and 70b and processed by the CPU 100 to detect the presence of an obstacle. In this case, when high-resolution images are captured and no obstacle is present, the high-resolution images are further processed as previously described thereby avoiding the need to recapture images of the whiteboard.

Obstacle detection in the above-described embodiments is used as a trigger or cue to inhibit processing of whiteboard images. If desired, obstacle detection can of course be used as a trigger or cue to capture and process whiteboard images, which may be advantageous in certain environments.

Although preferred embodiments of the present invention have been described, those of skill in the art will appreciate that variations and modifications may be made without departing from the spirit and scope thereof as defined by the appended claims.

What is claimed is:

1. A system for controlling image capture of a surface area on which information is recorded comprising:
    at least one imaging device capturing an image of said surface area;
    a moveable element located in a designated sub-region of said surface area and within the field of view of said at least one imaging device; and
    a processor in communication with said at least one imaging device, said processor receiving image data from said at least one imaging device and processing said image data to determine if a visible change in a position of said moveable element within said sub-region has occurred.

2. A system according to claim 1 wherein said processor, upon determination of said visible change in position of said moveable element, processes said image data to detect the presence of one or more obstacles in the captured image and further processes said captured image if no obstacle is detected therein.

3. A system according to claim 2 wherein said processor conditions said at least one imaging device to capture another image of said surface area if an obstacle is detected.

4. A system according to claim 2 wherein during said further processing said processor displays said captured image.

5. A system according to claim 2 wherein during said further processing said processor posts said captured image to an Internet accessible site.

6. A system according to claim 2 wherein during said processing, upon determination of said visible change in position of said moveable element, said processor:
    compares the captured image with a reference image and computes a difference image; and
    examines the difference image to determine if the difference image has pixels with values suggestive of an obstacle.

7. A system according to claim 6 wherein during said examining, said processor counts the number of pixels having values suggestive of an obstacle and compares the number with a threshold value.

8. A system according to claim 7 wherein during said comparing a negative difference image is computed by said processor.

9. A system according to claim 8 wherein said negative difference image is computed by calculating, for corresponding pixels in said reference and captured images the pixel value:

$$(255 - |R_{ij} - C_{ij}|)$$

where:
    $R_{ij}$ is the binary form of the pixel at the $i^{th}$ row and $j^{th}$ column in the reference image; and
    $C_{ij}$ is the binary form of the pixel at the $i^{th}$ row and $j^{th}$ column in the captured image.

10. A system according to claim 1 wherein said moveable element is slidable within said sub-region.

11. A system according to claim 10 wherein said surface area is a whiteboard on which information is recorded using a writing implement.

12. A system according to claim 10 wherein said moveable element is manually slidable within said sub-region.

13. A system according to claim 10 wherein said sub-region is adjacent a corner of said surface area.

14. A system according to claim 10 wherein said moveable element is slidable back and forth between two positions within said sub-region.

15. A system according to claim 14 wherein said moveable element is manually slidable between said two positions within said sub-region.

16. A system according to claim 15 wherein said sub-region is adjacent a corner of said surface area.

17. A camera-based system for controlling image capture of a surface area comprising:
    a generally horizontally extending boom assembly, said boom assembly being positioned above a surface area on which information is recorded, a designated sub-region of said surface area further comprising an optical switch thereon;
    at least one digital camera mounted on said boom assembly at a location spaced from the plane of said surface area, said at least one digital camera being oriented so that the field of view thereof encompasses said surface area including said optical switch; and
    a processor in communication with said at least one digital camera, said processor receiving image data from said at least one digital camera and processing said image data to detect actuation of said optical switch within said sub-region, said processor conditioning said at least one digital camera to capture another image of said surface area when actuation of said optical switch is detected.

18. A camera-based system according to claim 17 wherein said boom assembly supports a plurality of digital cameras, each of said digital cameras having a field of view that encompasses a different section of said surface area, fields of view of adjacent digital cameras overlapping slightly, said processor stitching image data from said plurality of digital cameras to form said captured image.

19. A camera-based system according to claim 18 wherein said boom assembly supports a pair of digital cameras.

20. A camera-based system according to claim 17 wherein said processor processes said another captured image to detect the presence of an obstacle by:
    comparing the another captured image with a reference image and computing a difference image; and
    examines the difference image to determine if the difference image has pixels with values suggestive of an obstacle.

21. A camera-based system according to claim 20 wherein during said examining, said processor counts the number of pixels having values suggestive of an obstacle and compares the number with a threshold value.

22. A camera-based system according to claim 21 wherein during said comparing a negative difference image is computed by said processor.

23. A camera-based system according to claim 22 wherein said negative difference image is computed by calculating, for corresponding pixels in said reference and captured images the pixel value:

$$(255-|R_{ij}-C_{ij}|)$$

where:
$R_{ij}$ is the binary form of the pixel at the $i^{th}$ row and $j^{th}$ column in the reference image; and
$C_{ij}$ is the binary form of the pixel at the $i^{th}$ row and $j^{th}$ column in the captured image.

24. A camera-based system according to claim 20 wherein during processing of said another captured image, said processor receives low resolution image data from said at least one digital camera and processes said low resolution image data to detect the presence of an obstacle in the captured image, said processor conditioning said at least one digital camera to acquire a high-resolution image of the surface area in the absence of an obstacle in the captured image.

25. A camera-based system according to claim 24 wherein said processor processes said high-resolution image to highlight writing on said surface area.

26. A camera-based system according to claim 24 wherein said processor has Internet server capabilities and is coupled to a distributed computer network to allow said captured high-resolution image to be accessed by a user through an Internet browser.

27. A camera-based system according to claim 26 wherein said processor is a dedicated appliance.

28. A camera-based system according to claim 26 wherein said processor is a personal computer.

29. A camera-based system according to claim 20 wherein during processing of said another captured image, said processor receives high-resolution image data from said at least one digital camera and processes said high-resolution image data to detect the presence of an obstacle in the captured image, said processor further processing said high resolution image to highlight writing on said surface area in the absence of an obstacle in the captured image.

30. A camera-based system according to claim 29 wherein said processor has Internet server capabilities and is coupled to a distributed computer network to allow said captured high-resolution image to be accessed by a user through an Internet browser.

31. A camera-based system according to claim 30 wherein said processor is a dedicated appliance.

32. A camera-based system according to claim 30 wherein said processor is a personal computer.

33. A camera-based system according to claim 17 wherein said boom assembly includes a wall mount, a boom extending outwardly from said wall mount and a camera head on a distal end of said boom, said camera head supporting said at least one digital camera.

34. A camera-based system according to claim 33 wherein said wall mount is releasably coupled to a wall plate secured to a wall surface.

35. A camera-based system according to claim 17 wherein said optical switch is slidable within said sub-region.

36. A camera-based system according to claim 35 wherein said optical switch is manually slidable within said sub-region.

37. A camera-based system according to claim 35 where said sub-region is adjacent a corner of said surface area.

38. A method of detecting actuation of a switch element mounted on a designated sub-region of a background surface on which information is to be recorded, in a captured image of said background surface, said method comprising the steps of:
comparing the captured image with a previously captured image of said background surface; and
determining, based on the comparison, whether a visual change in the position of said switch element within said sub-region on said background surface has occurred.

39. The method of claim 38 wherein said determining comprises determining whether said switch element has been slid from one position to another position within said sub-region.

40. The method of claim 39 further comprising capturing another image of said background surface if said switch element has been slid from one position to another position within said sub-region and examining said another image to determine if pixels thereof have values suggestive of an obstacle.

41. The method according to claim 40 wherein during said examining the number of pixels having values suggestive of an obstacle is counted and compared with a threshold value.

42. A method of capturing and storing images of a background surface on which information is recorded, said method comprising the steps of:
capturing low resolution images of the background surface;
processing the low resolution images to determine if a switch element located on a designated sub-region of said background surface has been actuated within said sub-region; and
if the switch element has been actuated, further processing the low resolution images.

43. The method of claim 42 wherein during said processing, the low resolution images are processed to determine if said switch element has changed positions within said sub-region.

44. The method of claim 43 wherein during further processing, the low resolution images are processed to determine if an obstacle obscuring the background surface exits therein.

45. The method of claim 44 further comprising capturing high resolution images of said background surface if no obstacle is obscuring the background surface.

46. The method of claim 45 further comprising the step of displaying the captured high resolution images.

47. The method of claim 45 wherein during said processing for each captured low resolution image, if no obstacle is detected therein, the captured low resolution image is compared with a previously captured low resolution image to determine if a change in the recorded information has been made, and if a change in the recorded information has been made, storing said high resolution images.

48. The method of claim 45 further comprising the step of processing said high-resolution images to highlight information recorded on said background surface.

49. The method of claim 45 further comprising the step of posting the high-resolution images to an Internet accessible site.

50. A method of capturing and storing images of a background surface on which information is recorded, said method comprising the steps of:
capturing an image of the background surface;

processing the image to determine if a moveable switch located in a designated sub-region of said background surface has visibly changed positions within said sub-region; and further processing the captured image if said moveable switch has visibly changed positions within said designated sub-region.

51. The method of claim 50 wherein said designated sub-region is adjacent a corner of said background surface.

52. The method of claim 51 wherein said visible change comprises movement of an element on said background surface from one position to another.

53. The method of claim 52 wherein said further processing comprises processing the captured image to determine if an obstacle obscuring the background surface exists therein and if not, highlighting information recorded on the background surface.

54. The method of claim 53 wherein images of the background surface are captured at intervals and wherein during the further processing, if no obstacle is detected in the captured image, the captured image is compared with a previously captured image to determine if a change in the recorded information has been made, and if a change in the recorded information has been made, further processing the image to highlight the recorded information.

* * * * *